Patented July 4, 1944

2,352,849

UNITED STATES PATENT OFFICE 2,352,849

HALOGENATED STEROID DERIVATIVES AND PROCESS OF PREPARING SAME

Russell Earl Marker, State College, Pa., assignor to Parke, Davis & Company, Detroit, Mich., a corporation of Michigan No Drawing. Application August 3, 1940, Serial No. 351,145

18 Claims. (Cl. 260—239.5)

This invention relates to halogenated steroidal derivatives and process of preparing same, and more particularly to side chain halogenated derivatives of sapogenins and processes for preparing the same.

An object of this invention, therefore, is the preparation of new side chain halogenated steroidal sapogenin derivatives.

Another object of this invention is the preparation of steroidal sapogenin derivatives useful as intermediates for the preparation of steroidal hormones.

Another object of this invention is the preparation of steroidal sapogenin derivatives having reactive groupings in the side chain.

Other objects of this invention will be apparent from a perusal of the specification and the appended claims.

The naturally occurring steroidal saponins [Fieser, Chemistry of Natural Products Related to Phenanthrene, (Reinhold Publ. Corp., N. Y. C., 1936), p. 317 et seq.] may be hydrolyzed to yield sugars and a sugar-free moiety, designated as the aglycone. The aglycones of these steroidal saponins are designated steroidal sapogenins, and the term steroidal sapogenin is commonly employed by workers in this field to include also nuclear transformation products of these aglycones.

These aglycones have, in general, the formula $C_{27}H_{42-4}O_{3-5}$, of which the portion $C_8H_{16}O_2$ is known to be present as a side chain attached to ring D of the steroid skeleton. Tschesche and Hagedorn (Ber. 68, 2247 (1935)) proposed the formula

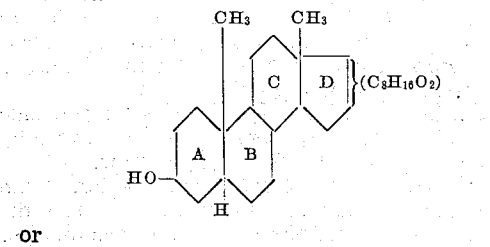

or

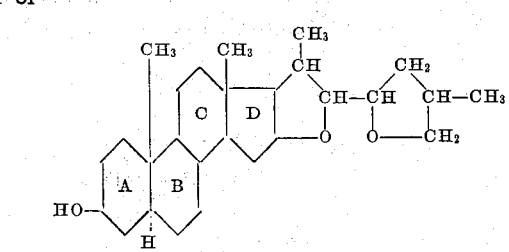

for the sapogenin, tigogenin, and later workers have, with reservations, accepted this formulation of the steroidal sapogenin side chain. Other sapogenins such as digitogenin, gitogenin, chlorogenin, diosgenin, and sarsasapogenin have shown to differ from tigogenin only in regard to the connections between ring A and B, the degree of saturation of the ring system, and the number of substituents attached to these rings.

These differences are shown below:

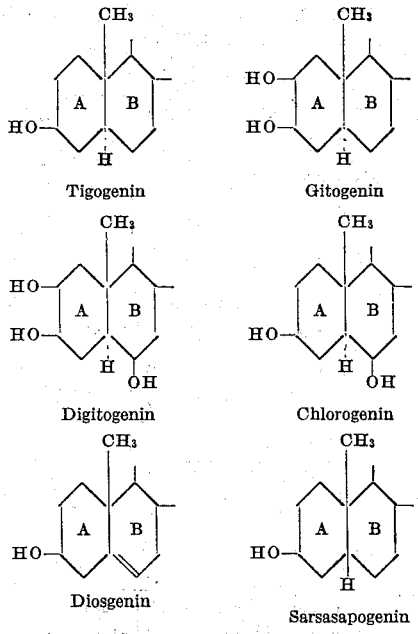

I have recently suggested (Marker & Rohrmann J. Am. Chem. Soc. 61, 846 (1939)) that a more likely structure for the side chain of these steroidal sapogenins is that shown below.

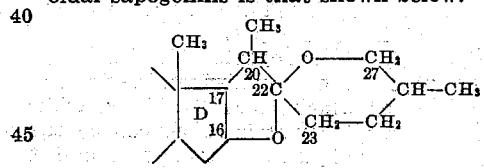

It is apparent that this formulation differs from that of Tschesche and Hagedorn in that the linkage, $C_{27}-O-$, is transferred from $C_{23}$ to $C_{22}$. However, a profound difference in the nature of the functional character of the side chain oxygen atoms is implied, for while the Tschesche-Hagedorn formula is that of an $\alpha, \alpha'$-di-tetrahydrofuryl derivative, the Marker-Rohrmann formula is that of a spiro-ketal.

Recently it has been found (Marker & Rohrmann, J. Am. Chem. Soc. 61, 846, 1516, 2724, 3479, (1939); 62, 647, 896, 1162) that the side chain of the naturally occurring sapogenins exists in two modifications. Sarsasapogenin contains one type of side chain characterized by the fact that a sapogenin of this type is readily reduced according to the Clemmensen procedure using alcoholic hydrochloric acid and amalgamated zinc (Marker & Rohrmann, J. Am. Chem. Soc. 61, 846 (1939)) to give tetrahydro derivatives, that is to say, new sapogenin derivatives in which the side chain has 4 more hydrogen atoms than in the sapogenins themselves. Tigogenin, gitogenin, digitogenin, chlorogenin and diosgenin behave differently from sarsasapogenin in that they are not reduced by the Clemmensen procedure, that is to say, they are recovered unchanged after boiling with alcoholic hydrochloric acid and amalgamated zinc. Isosarsasapogenin is converted under the conditions of the Clemmensen reduction to the same tetrahydrosarsasapogenin that sarsasapogenin itself yields. These facts, and others which are cited in the references listed, appear to me to be best explained by assuming that the two types of steroidal sapogenin side chains differ in regard to optical isomerism about $C_{22}$. Accordingly, when it is necessary to distinguish between isomers about $C_{22}$ I represent the two types of side chains by formulae of the following type:

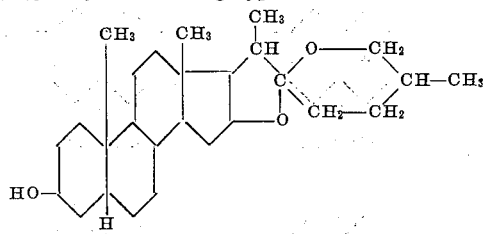

Sarsasapogenin
("Sarsasapogenin type" side chain)

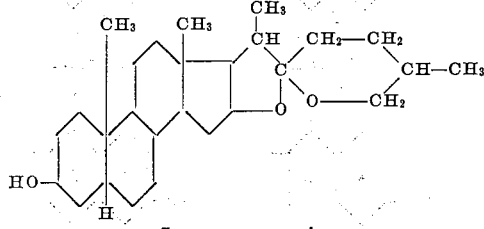

Isosarsasapogenin
("Tigogenin type" side chain)

See especially Marker & Rohrmann, J. Am. Chem. Soc. 62, 896 (1940). Ordinarily where isomerism about $C_{22}$ is not of importance, the formula for the sarsasapogenin type of side chain will be used for configurations both of sarsasapogenin and tigogenin type.

These two types of sapogenin side chains appear to be subject to an equilibrium, the velocity of attainment of which is catalyzed by acidic reagents. The equilibrium is influenced by the configuration of the hydrogen atom at $C_5$, and it appears that the following rule holds true. For compounds of the "allo" series (cholestane type) the tigogenin type of side chain is the more stable, while for compounds of the regular series (coprostane type) at $C_5$ the sarsasapogenin side chain is the more stable.

For the purpose of greater clarification, the Marker-Rohrmann formulation of the side chain of the steroidal sapogenins will be used in describing the invention. It is to be understood, however, that the processes and products of the present invention may be obtained by the use of the methods herein to be described and these processes and products are claimed without any implications that the reactions and structures involved will ultimately be proved to be as represented herein.

I have found that steroidal sapogenins may be halogenated, under acidic conditions, to give side chain halogenated steroidal sapogenins. Furthermore, I have found that this halogenation occurs with surprising ease, especially when it is considered that the side chain of the steroidal sapogenins has long been considered to be rather inert to the ordinary reagents of organic chemistry. While I have thus found that the side chain of the steroidal sapogenins is readily monohalogenated, thus far I have not succeeded in introducing more than one halogen atom into the side chain. Furthermore, I find that the halogenation proceeds best in an acidic solvent such as acetic acid, propionic acid or any other of the lower aliphatic acids. These new side chain halogenated sapogenin derivatives I call halosapogenins. By the term halogen as applied to my new compounds and their preparation, I mean chlorine and bromine, thereby excluding fluorine and iodine. Fluorine is excluded because of the difficulty of controlling its behavior, while iodine is excluded because of its inertness.

The halosapogenins show certain characteristic reactions which distinguish them from the sapogenins themselves. Thus:

(a) Whereas the sapogenins themselves are readily oxidized by selenium dioxide, for example, when the sapogenin is heated for awhile with selenium dioxide in acetic acid-benzene, the side chain halogenated sapogenins are inert to selenium dioxide under comparable conditions;

(b) Whereas the sapogenins themselves are inert to certain reducing agents such as zinc dust and acetic acid or sodium and alcohol, the side chain halogenated sapogenins are reduced by these reagents to the parent sapogenins themselves.

On the other hand, the side chain halogenated sapogenins also show certain reactions in common with the sapogenins themselves. Thus:

(a) Like the sapogenins the side chain halogenated sapogenins fail to give any tests with the usual reagents for hydroxyl, carboxyl or ketone groups in the side chain;

(b) Like the sapogenins the side chain halogenated sapogenins can be reduced according to the Clemmensen procedure, especially using alcoholic hydrochloric acid and amalgamated zinc, to give tetrahydrosapogenins;

(c) Like the sapogenins themselves the side chain halogenated sapogenins can be catalytically hydrogenated to give dihydrosapogenins.

It is to be understood that the reduction of the side-chain halogenated sapogenins to the dihydrosapogenins proceeds in two steps as follows:

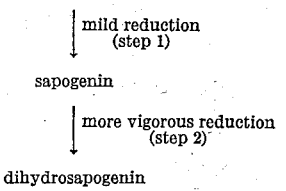

As already indicated, step 1 is accomplished by the use of zinc dust and acetic acid, or by the action of sodium and alcohol. This step may also be accomplished by controlled catalytic hydrogenation, as in Example 5. Step 2 is accomplished by more vigorous reduction, the best results usually being obtained by vigorous catalytic hydrogenation, usually above room temperatures. Obviously, the application of this mode of reduction to the side-chain halogenated sapogenins yields the dihydrosapogenins directly.

Advantage of step 1 may be taken to prepare nuclear transformation products having the sapogenin side-chain. The sapogenin side-chain is readily attacked by many reagents including selenium dioxide, hydrogen peroxide, bromine and other reagents reactive with ketones; since the monohalogenated side-chain is inert to reagents of this type, the presence of the side-chain halogen atom may be utilized as a means of protection for the side-chain, while nuclear transformations are effected, after which the side-chain halogen atom may be reduced off according to step 1 above. A sequence of transformations of this type is given in Example 7, wherein a method is given for the preparation of neotigogenin from sarsasapogenin. This method makes this hitherto almost inaccessible sapogenin available in large quantities from an inexpensive source.

The new side chain halogenated sapogenin derivatives may be represented by the following formula

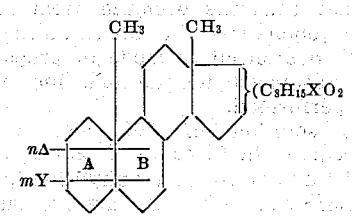

where X is a member of the class consisting of chlorine and bromine, where the symbol $n\Delta$ represents $n$ carbon-to-carbon double bonds in the A—B portion of the steroid nucleus, $n$ having one of the values 0, 1, 2 and 3, and where the symbol $mY$ represents $m$ substituents attached to the methylene carbon atoms of the A—B portion of the steroid nucleus, said substituents being selected from the class consisting of (=O),

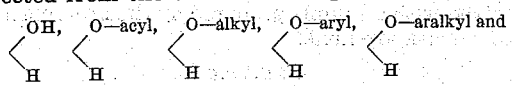

$m$ having one of the values 0, 1, 2 and 3, $m$ and $n$ being so chosen that their sum $m+n$ does not exceed the value 3.

While I do not wish to be limited to any specific formula for my new side chain halogenated sapogenin derivatives, I believe that the properties of these substances are best explained by one of the two following types of formulae illustrated for the case of a side chain halogenated sarsasapogenin:

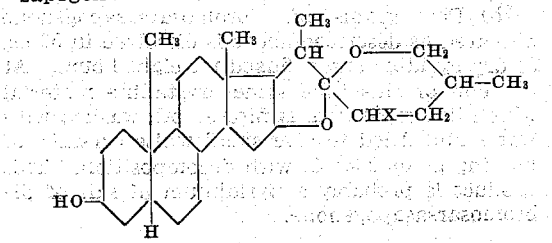

or

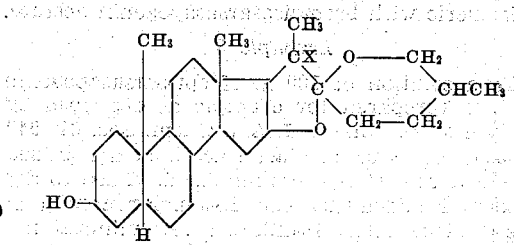

where X is chlorine or bromine.

In practicing my invention I may proceed as follows. The steroidal sapogenin to be halogenated is dissolved in an organic solvent and the solution rendered acid, preferably by treatment with a mineral acid. To this solution is added one mole, or a slight excess, of the free halogen, either chlorine or bromine, preferably in an organic solvent. After a short time the reaction is complete and the side chain halogenated sapogenin derivative may be isolated according to the methods best adapted to the properties of the particular side chain halogenated sapogenin derivative thus formed.

My invention may be further illustrated by the following examples:

*Example 1*

1 g. of sarsasapogenin acetate is dissolved in 35 cc. of glacial acetic acid and the solution cooled to 20° C. Then two drops of 48% hydrobromic acid is added and the mixture treated with 2.2 cc. of 1.05 molar bromine in acetic acid solution over a period of ten minutes. The bromine is readily taken up with liberation of hydrogen bromide. After the mixture has stood for ten minutes it is poured into water and the precipitated material filtered and washed with water. The residue is crystallized from acetone-ethyl acetate to give fine white needles, melting at 208° C. with decomposition.

On larger runs, the bromosarsasapogenin acetate may be obtained as large white prisms melting at 195° C. with decomposition. This substance appears to be identical with the bromosarsasapogenin acetate, melting point 208° C. described above, for it has the same composition and behaves the same in the various reactions carried out with it.

Instead of using sarsasapogenin acetate, other esters of sarsasapogenin, such as the butyrate or the benzoate may be used in this example.

*Example 2*

(a) Isosarsasapogenin acetate is prepared according to the directions of Marker and Rohrmann, J. Am. Chem. Soc. 61, 846 (1939).

(b) To a solution of 1 g. of isosarsasapogenin acetate in 35 cc. of glacial acetic acid at 20° C. is added two drops of 48% hydrobromic acid, then the solution is treated with 2.2 cc. of 1.05 molar bromine in acetic acid solution over a period of ten minutes. Bromine is readily taken up with liberation of hydrogen bromide. After ten minutes the mixture is poured into water and the precipitated material collected and washed with water. This solid product is crystallized from methanol-acetone to give flat white needles of melting point 170° C.

The bromoisosarsasapogenin acetate of this example is different from the bromosarsasapogenin acetate of the previous example, and it depresses in melting point with preparations of the previous example melting either at 208° C. or 195° C.

It is thought that bromosarsasapogenin acetate is isomeric with bromoisosarsasapogenin acetate.

Example 3

To a solution of 100 g. of epi-sarsasapogenin acetate (prepared for example as described by Marker & Rohrmann, J. Am. Chem. Soc. 61, 943 (1939)) in 10 cc. of glacial acetic acid is added one drop of 48% hydrobromic acid. Then to the mixture is added 0.25 cc. of 1.05 molar bromine in acetic acid. After standing a few minutes the solution is poured into water and the precipitate collected, washed with water and dried. The white solid is crystallized from acetone to give small white plates of melting point 180° C. This is bromo-epi-sarsasapogenin acetate.

Example 4

(a) Desoxysarsasapogenin is prepared as for example by Marker & Rohrmann, J. Am. Chem. Soc. 61, 1284 (1939).

(b) To a solution of 100 mg. of desoxysarsasapogenin in 60 cc. of glacial acetic acid acidified with five drops of 48% of hydrobromic acid is added 0.25 cc. of 1.05 molar bromine in glacial acetic acid. The bromine is taken up with difficulty, but after standing about fifteen minutes all of it has been absorbed. Then the solution is poured into water and the precipitate collected and washed with water. The dried material is crystallized from acetone to give white crystals, melting point 170° C. This is bromodesoxysarsasapogenin.

This substance shows no evidence of oxidation when heated for thirty minutes with selenium dioxide in acetic acid-benzene.

Example 5

To 200 mg. of tigogenin acetate in 30 cc. of glacial acetic acid containing two drops of 48% hydrobromic acid is added at room temperature 0.5 cc. of 1.05 molar bromine in glacial acetic acid. The bromine is taken up rather slowly but after about fifteen minutes the reaction is complete. Then the solution is diluted with water and the precipitate collected, washed with water and dried. The product is crystallized from acetone to give white needles of bromotigogenin acetate of melting point 223° C. with decomposition.

This substance shows no evidence of oxidation when heated for twenty minutes at 90° C. with selenium dioxide in acetic acid.

The side chain halogenated sapogenin derivatives are readily reduced to the parent sapogenins by catalytic hydrogenation in acidic solution or by reduction with an alkali metal and an alcohol. To illustrate the latter mode of reduction a solution of 50 mg. of bromotigogenin acetate in 50 cc. of boiling absolute alcohol may be reduced by adding two g. of sodium over a period of forty-five minutes. The solution is diluted with water, the precipitated solids taken up in ether, the ether layer separated and washed with water, and the ether evaporated. The residue is crystallized from methanol to give small white plates of melting point 202–203° C. This is tigogenin and it gives no depression in melting point when mixed with an authentic sample.

Example 6

A solution of 820 mg. of sarsasapogenin in 50 cc. of glacial acetic acid is cooled to 20° C. Then two drops of hydrobromic acid is added and the solution is treated with 2.1 cc. of 1.05 molar bromine in acetic solution. The bromine is taken up rather readily with liberation of hydrogen bromide. After twenty minutes the mixture is poured into water and the precipitated solids collected and washed with water. The dried crude product is crystallized from aqueous acetone to give white needles which begin to decompose at about 125° C.

When the bromination of sarsasapogenin is carried out on a somewhat larger scale (5–10 g. lots), the reaction mixture often becomes deep blue in color.

Example 7

The side chain of the sapogenins is frequently more readily brominated than a methylene group adjacent to a nuclear 3-keto group. This is shown in the following example.

A solution of 1 g. of sarsasapogenone in 35 cc. of glacial acetic acid is cooled to 20° C. and acidified with two drops of 48% hydrobromic acid. Then 2.2 cc. of 1.05 molar bromine in acetic acid is added dropwise over a period of ten minutes. The bromine is readily absorbed with liberation of hydrogen bromide. The mixture is poured into water, the precipitated solids collected, washed with water and dried. The dried residue is crystallized from acetone to give white crystals of melting point 190° C. with decomposition. This is bromosarsasapogenone, in which the bromine atom is in the side chain.

To show that the bromine atom of bromosarsasapogenone is in the side chain and in order to show an alternative mode of preparation of bromosarsasapogenone, the following experiment may be performed.

To a solution of 100 mg. of bromosarsasapogenin in 50 cc. of glacial acetic acid is added 300 mg. of chromic anhydride in 10 cc. of 80% acetic acid. After the mixture has stood at room temperature for forty-five minutes, it is poured into water, the precipitated material extracted with ether, and the ethereal extract washed with sodium carbonate solution and water. The ether is evaporated on the steam bath and the residue crystallized from acetone to give pale tan needles of melting point 191° C. with decomposition. This is bromosarsasapogenone and it gives no depression in melting point when mixed with a sample prepared by the bromination of sarsasapogenone.

Example 8

(a) To a solution of 7 g. of sarsasapogenone in 350 cc. of glacial acetic acid is added five drops of 48% hydrobromic acid, and then 33.8 cc. of 1.05 molar bromine acetic acid is run in slowly over a period of forty minutes at room temperature. The solution becomes intensely blue and much hydrogen bromide is liberated. The solution is poured into water and the precipitate collected and washed with water. The dried material is crystallized from acetone-ethyl acetate and gives small compact white crystals of dibromo-sarsasapogenone, melting point 190° C. with decompoistion.

(b) Five grams of dibromosarsasapogenone prepared as described above is dissolved in 50 cc. of dry pyridine and refluxed for eight hours. At the end of this time some crystalline material which has separated, is filtered off, washed with water and dried to give small white crystals, of melting point 235° C. with decomposition. This product is probably a pyridinium of salt of dibromosarsasapogenone.

The filtrate from the above separation of the pyridinium salt is poured into dilute sulfuric acid and the precipitated solid taken up in ether. The ethereal solution is treated with Norite, evaporated, and the residue crystallized from acetone to give small compact white crystals of melting point 185–188° C. with decomposition. This substance is bromo-Δ⁴-dehydrosarsasapogenone, in which the bromine is in the side chain. It has the following formula:

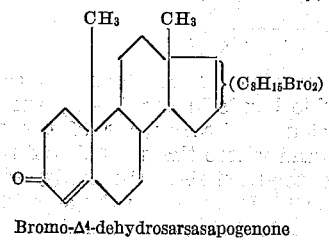

Bromo-Δ⁴-dehydrosarsasapogenone (c) To a boiling solution of 2 g. of bromo-Δ⁴-dehydrosarsasapogenone (prepared as described above) in 400 cc. of absolute alcohol is added 17 g. of sodium over a period of one hour. Water is added and the precipitated solids taken up in ether, washed well with water and the ether evaporated. The residual sirup is dissolved in about 100 cc. of alcohol and added to a solution of 3 g. of digitonin in 300 cc. of 80% alcohol. The insoluble digitonide which separates, is collected, washed with ether and dried. The dried digitonide is heated for twenty minutes with 30 cc. of pyridine on a steam bath. Then the solution is diluted with water, extracted with ether and the ethereal layer washed well with dilute sulfuric acid. The ether is filtered through Norite, and the ether removed on the steam bath. The residue is dissolved in methanol, treated with Norite and crystallized from methanol to give small white crystals, melting point 198–200° C. This depresses in melting point with tigogenin, melting point 204–206° C. to 179–192° C., but gives no depression with a sample of neotigogenin, melting point 199–201° C. The product, therefore, is identical with neotigogenin (Goodson & Noller, J. Am. Chem. Soc. 61, 2429 (1939).

*Example 9*

To a solution of 300 mg. of gitogenin diacetate in 30 cc. of acetic acid acidified with two drops of 48% hydrobromic acid is added 0.6 cc. of 1.05 molar bromine in acetic acid. After the mixture has stood for a short time it is diluted with water and the precipitate collected, washed with water and dried. The dried product is crystallized from acetonemethanol to give white needles of bromogitogenin diacetate, melting point 219–220° C. with decomposition.

The bromogitogenin diacetate of this example may be reduced with sodium and absolute alcohol in a manner similar to that given in Example 5, to obtain gitogenin of melting point 265–267° C.

The bromogitogenin diacetate of this example shows no evidence of reaction when heated with an acetic acid solution of selenium dioxide.

*Example 10*

To a solution of 300 mg. of digitogenin triacetate in 30 cc. of acetic acid acidified with two drops of 48% hydrobromic acid is added 0.55 cc. of 1.05 molar bromine in acetic acid. The mixture is allowed to stand for about twenty minutes and then is poured into water and extracted with ether. The ethereal layer is separated, washed with water and evaporated to dryness. The residue is crystallized from aqueous methanol to give white crystals of bromodigitogenin triacetate of melting point 142° C. with decomposition.

Its behavior toward selenium dioxide and to sodium and alcohol is analogous to that of bromogitogenin diacetate and other side chain halogenated sapogenins of this invention.

*Example 11*

To a solution of 500 mg. of chlorogenin diacetate in 40 cc. of glacial acetic acid containing two drops of concentrated hydrochloric acid is added 1.1 cc. of 1.05 molar bromine in acetic acid as rapidly as the bromine is absorbed. Then the solution is poured into water and the precipitate collected and washed with water. The dried residue is crystallized from methanol to give white crystals of bromochlorogenin diacetate of melting point 200° C. with slight decomposition.

*Example 12*

(a) Sarsasapogenyl chloride is prepared according to the directions of Simpson & Jacobs, J. Biol. Chem. 110, 565 (1935).

(b) 1 g. of sarsasapogenyl chloride in 35 cc. of chloroform is diluted with 10 cc. of acetic acid and 3 drops of 48% hydrobromic acid are added. To this mixture is added slowly a solution of 0.18 g. of dry chlorine gas in 20 cc. of 1:1 acetic acid-chloroform. After the mixture has stood for an hour it is poured into water, extracted with chloroform and the chloroform solution washed with water. The chloroform is removed on the steam bath and the residue crystallized from slightly diluted methanol to give chlorosarsasapogenyl chloride in the form of white crystals. This compound may be represented by the following formula:

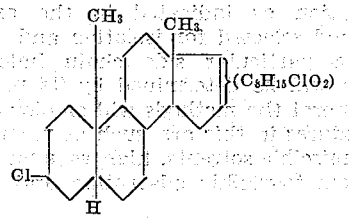

Chlorosarsasapogenyl chloride

The foregoing examples illustrative of my invention are subject to numerous variations in regard to the sapogenins employed, conditions of reaction, the modes of removing the products from reaction mixtures, and the like. All of these variations herein described and claimed fall within the scope of my invention.

Steroidal sapogenins on which this invention may be practiced include not only the aglycones of the naturally occurring steroidal saponins, but also their nuclear transformation products, having the steroid skeleton, i. e., the substances derived from the aglycones by changes in rings A and/or B which leave the carbon skeleton intact and which also leave the side chain attached to ring D still intact and the same as that in the aglycones. Thus, this invention may be practiced on steroidal sapogenins such as smilagenin, sarsasapogenone, 3-desoxysarsasapogenin, the sarsasapogenyl chlorides, and the like.

As is illustrated by Examples 1 and 2, sapogenins having either configuration with regard to $C_{22}$—that is to say sapogenins having either the sarsasapogenin type of side chain or the tigogenin type of side chain—may be side chain halogenated to give the corresponding isomeric side chain halogenated sapogenins.

It will be apparent that in practicing my invention on certain types of sapogenins, transformations may occur in the nucleus in rings A and B as well as in the side chain. For example, if nuclear ketone groups are present, the products obtained by the practice of my invention are dependent upon the conditions employed. Thus in the case of sarsasapogenone I have found that the use of only one mole of halogenating agent leads to the formation almost exclusively of the side chain halogenated sapogenin compound. But if a second mole of halogenating agent be added to the reaction mixture, this side chain halogenated sapogenin compound is further halogenated in the nucleus on a carbon atom adjacent to the reactive ketone group, forming dibromosarsasapogenone.

Again diosgenin on halogenation according to my invention absorbs two moles of bromine to form bromodiosgenin dibromide in which two bromine atoms have been added to the double bond at $C_5$.

Generalizing, I have observed that nuclear hydroxyl groups, or their hydrolyzable derivatives such as —O—acyl, —O—aralkyl and halogen, are not affected, but double bonds and reactive ketone groups in the nucleus in rings A and B are transformed as suggested above. That is to say, a methylene group adjacent to a reactive nuclear ketone group is halogenated after the side chain of the sapogenin has been halogenated, while nuclear double bonds add halogen simultaneously with the halogenation of the sapogenin side chain.

Other modes of isolating and purifying the side chain halogenated sapogenins of this invention may be used instead of extraction with ether and crystallization as indicated in the examples. The method selected for isolation and purification of a particular side chain halogenated sapogenin will be determined by its properties, but in general the methods will employ customary procedures in this art, such as partition between immiscible solvents, high vacuum distillation, chromatographic adsorption and like devices.

Accordingly, I do not wish my invention to be limited to any specific embodiment but rather desire that it be interpreted as broadly as possible in view of the prior art and the appended claims.

What I claim as my invention is:

1. Process for preparing a halosapogenin which comprises subjecting a steroidal sapogenin to the action of a member of the class consisting of chlorine and bromine, the quantity of halogen being at least one equivalent of halogen in excess of that which will react with any nuclear double bonds in said steroidal sapogenin, thereby forming a steroidal sapogenin having a monohalogenated side-chain.

2. Process according to claim 1 wherein the halogenation is conducted under acidic conditions.

3. Process according to claim 1 wherein the halogenation is conducted in the presence of an organic acid.

4. Process according to claim 1 wherein the halogenation is conducted in the presence of acetic acid.

5. Process according to claim 1 where the halogenating agent is bromine.

6. Process for preparing a halosapogenin which comprises subjecting to the action of a member of the class consisting of chlorine and bromine a compound having the formula,

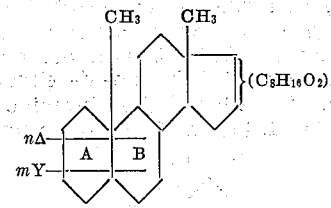

where the symbol $n\Delta$ represents $n$ carbon-to-carbon double bonds in the A—B portion of the steroid nucleus, $n$ having one of the values 0, 1, 2 and 3, and where the symbol $mY$ represents $m$ substituents attached to the methylene carbon atoms of the A—B portion of the steroid nucleus, said substituents being selected from the class consisting of (=O),

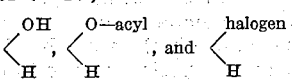

$m$ having one of the values 0, 1, 2 and 3, $m$ and $n$ being so chosen that their sum, $m+n$, does not exceed the value 3, the quantity of halogen being at least one equivalent of halogen in excess of that which will react with any nuclear double bonds in said steroidal sapogenin, thereby forming a steroidal sapogenin having a monobrominated side-chain.

7. Process for preparing a sapogenin derivative which comprises subjecting a compound having the formula,

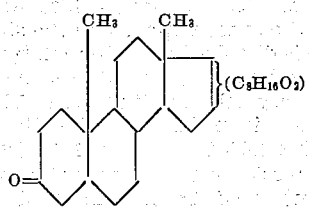

to the action of a member of the class consisting of chlorine and bromine, thereby forming a sapogenin derivative halogenated at least in the side-chain.

8. Process according to claim 7 in which substantially only one mole of halogenating agent is employed, thereby forming a nuclear unhalogenated side chain halogenated sapogenin derivative.

9. Process for preparing a halosapogenin which comprises subjecting a compound having the formula,

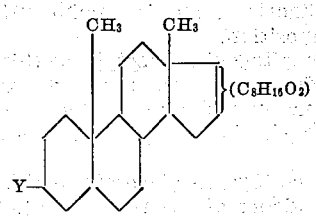

where Y is selected from the class consisting of hydroxyl and groups hydrolyzable to hydroxyl, to the action of a member of the class consisting of chlorine and bromine the quantity of halogen being at least one equivalent of halogen in excess of that which will react with nuclear double bonds in said compound, thereby forming a sapogenin derivative halogenated in the side-chain.

10. Process according to claim 9 wherein the sapogenin halogenated is selected from the group consisting of sarsasapogenin and its esters.

11. Process according to claim 9 in which the halogenating agent is bromine.

12. A side-chain mono-halogenated steroidal sapogenin derivative having the formula,

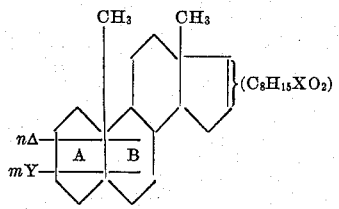

where X is a member of the class consisting of chlorine and bromine, where the symbol $n\Delta$ represents $n$ carbon-to-carbon double bonds in the A—B portion of the steroid nucleus, $n$ having one of the values 0, 1, 2 and 3, and where the symbolt $mY$ represents $m$ substituents attached to the methylene carbon atoms of the A—B portion of the steroid nucleus, said substituents being selected from the class consisting of (=O),

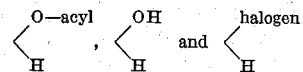

and said side-chain mono-halogenated steroidal sapogenin derivative being still further characterized by having the side-chain halogen atom in the position taken on direct halogenation of the side-chain of the corresponding sapogenin.

13. A sarsasapogenin ester having a monobrominated side-chain characterized in that the side-chain ($C_8H_{15}BrO_2$) is unaffected by selenium dioxide in acetic acid, and in that the side-chain ($C_8H_{15}BrO_2$) is reduced to the sapogenin side-chain ($C_8H_{16}O_2$) by the action of the combination of sodium and alcohol, said side-chain monobrominated sarsasapogenin ester being identical with the product obtained by reacting the corresponding sarsasapogenin ester with bromine in acetic acid.

14. An iso-sarsasapogenin ester, having a monobrominated side-chain characterized in that the side-chain ($C_8H_{15}BrO_2$) is unaffected by selenium dioxide in acetic acid, and in that the side-chain ($C_8H_{15}BrO_2$) is reduced to the sapogenin side-chain ($C_8H_{16}O_2$) by the action of the combination of sodium and alcohol, said side-chain monobrominated iso-sarsasapogenin ester being identical with the product obtained by reacting the corresponding iso-sarsasapogenin ester with bromine in acetic acid.

15. Sarsasapogenin acetate having a monobrominated side-chain, melting with decomposition at approximately 208° C. and approximately 195° C.

16. Iso-sarsasapogenin acetate having a monobrominated side-chain, melting at approximately 170° C.

17. Sarsasapogenone, having a monobrominated side-chain melting with decomposition at approximately 191° C.

18. A side-chain mono-halogenated steroidal sapogenin having at ring D the structure,

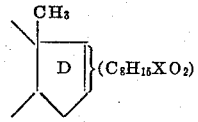

where X is a member of the class consisting of chlorine and bromine, and having in the remainder of the steroid skeleton only such groups as are uneffected by the mild action of halogen, said halosapogenin having the side-chain halogen atom in the position taken on direct halogenation of the side-chain of the corresponding sapogenin.

RUSSELL EARL MARKER.